(12) United States Patent
Ambat et al.

(10) Patent No.: US 9,483,504 B2
(45) Date of Patent: *Nov. 1, 2016

(54) SYSTEM AND METHOD FOR APPLICATION AWARE DE-DUPLICATION OF DATA BLOCKS IN A VIRTUALIZED STORAGE ARRAY

(71) Applicant: NETAPP, INC., Sunnyvale, CA (US)

(72) Inventors: Gopakumar Ambat, Bangalore (IN); Giribabu Balaraman, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/936,564

(22) Filed: Jul. 8, 2013

(65) Prior Publication Data
US 2013/0297571 A1 Nov. 7, 2013

Related U.S. Application Data

(63) Continuation of application No. 12/954,848, filed on Nov. 27, 2010, now Pat. No. 8,504,531.

(51) Int. Cl.
| | |
|---|---|
| *G06F 7/00* | (2006.01) |
| *G06F 17/00* | (2006.01) |
| *G06F 17/30* | (2006.01) |
| *G06F 3/06* | (2006.01) |
| G06F 13/14 | (2006.01) |

(52) U.S. Cl.
CPC ......... *G06F 17/30303* (2013.01); *G06F 3/067* (2013.01); *G06F 3/0608* (2013.01); *G06F 3/0641* (2013.01)

(58) Field of Classification Search
CPC .................. G06F 17/30156; G06F 17/30489; G06F 17/30303; G06F 17/30159; G06F 17/30286; G06F 17/3064; G06F 17/30873; G06F 3/0641

USPC ............... 707/692, 705, 769, 812, 823, 758, 707/E17.002, 740, 741, 737, E17.087, 707/E17.089, 664, 711, 999.101; 709/213, 709/217, 223

See application file for complete search history.

(56) References Cited

U.S. PATENT DOCUMENTS

| | | | |
|---|---|---|---|
| 6,516,337 B1 * | 2/2003 | Tripp ................ | G06F 17/30613 707/999.104 |
| 8,849,767 B1 * | 9/2014 | Zheng .................. | G06F 3/0641 707/664 |
| 2009/0063795 A1 * | 3/2009 | Yueh ..................... | G06F 3/0608 711/162 |
| 2010/0262790 A1 * | 10/2010 | Perego ................. | G11C 7/1075 711/154 |
| 2011/0138154 A1 | 6/2011 | Tevis et al. | |

* cited by examiner

Primary Examiner — Usmaan Saeed
Assistant Examiner — Cecile Vo
(74) Attorney, Agent, or Firm — Haynes and Boone, LLP

(57) ABSTRACT

A system and method for application aware de-duplication of data blocks in a virtualized storage array is disclosed. In one embodiment, in a method of de-duplication of data, a master list of metadata is created based on a number of occurrences of data blocks within a storage array. A first sublist of metadata is created from the master list of metadata. The first sublist of metadata is provided to a first component of a networked storage system. It is determined whether the data block being written has a corresponding entry in the master list of metadata based on a determination that a data block being written does not have any corresponding entry in the first sublist of metadata. The data block being written is replaced with a pointer based on a determination that the data block being written has a corresponding entry in the master list of metadata.

20 Claims, 5 Drawing Sheets

SYSTEM AND METHOD FOR APPLICATION AWARE DE-DUPLICATION OF DATA BLOCKS IN A VIRTUALIZED STORAGE ARRAY

PRIORITY DATA

This application is a Continuation of U.S. Ser. No. 12/954,848 filed on Nov. 27, 2010, now U.S. Pat. No. 8,504,531, entitled "System and Method for Application Aware De-Duplication of Data Blocks on a Virtualized Storage Array," the entire disclosure of which is incorporated herein by reference in its entirety.

BACKGROUND

Embodiments of the present subject matter relate to the field of storage systems. More particularly, embodiments of the present subject matter relate to de-duplication (de-dup) of data blocks on a virtualized storage array.

Data de-dup refers to comparing data blocks and removing duplicate data blocks to free up space in storage systems. Typically, de-dup is performed either at a file level or at a block level. Most of the storage vendors provide a host-based and/or an appliance based de-dup solutions. These solutions require additional hardware or appliance like data domain, or very specialized software like a specialized file system with additional de-dup aware business logic to perform the de-dup. Addition of these hardware components or appliance into a storage area network fabric for performing the de-dup requires a very high processing power for identifying duplicate data blocks in a data stream and may also need a physical location for storing a unique copy of each duplicate data block. Further, the new hardware or software component in the storage system may need to be configured and can require maintenance and support. This may result in an increased expense and complexity in the storage system.

SUMMARY

A system and method for application aware de-duplication (de-dup) of data blocks in a virtualized storage array is disclosed. According to one aspect of the present subject matter, in a method for application aware de-dup of data blocks on virtualized storage arrays in a storage area network (SAN), a de-dup agent is enabled on each of one or more components of the SAN. The one or more components of the storage array include a host device, a data path module (DPM), and virtualized storage arrays. Then, a master list of metadata associated with indexed data is created and stored in the virtualized storage arrays. One or more sublists of metadata are created from the masterlist and are stored in remaining one or more components of the SAN.

Upon receiving a write request from an application residing in the host device, it is determined whether a data block being written has an entry in the sublist stored in the host device. If so, the data block is replaced with a pointer indicating where the data block is residing in the virtualized storage arrays. If not, it is determined whether the data block being written has an entry in the sublist stored in the DPM. If it is determined that the data block being written has an entry in the sublist stored in the DPM, the data block is replaced with a pointer indicating where the data block is residing in the virtualized storage arrays.

If it is determined that the data block being written has no entry in the sublist stored in the DPM, it is determined whether the data block being written is in the masterlist stored in the virtualized storage arrays. If it is determined that the data block being written is in the masterlist stored in the virtualized storage arrays, the data block is replaced with a pointer indicating where the data block is residing in the virtualized storage arrays, and if it is determined that the data block being written is not in the masterlist stored in the virtualized storage arrays, the data block is written in one of the virtualized storage arrays. Further, the masterlist in the virtualized storage arrays is updated to include metadata associated with the written data block.

According to another aspect of the present subject matter, a SAN includes a host device, a DPM connected to the host device, and one or more virtualized storage arrays connected to the DPM. Each of the host device, the DPM and the one or more virtualized storage arrays includes an associated de-dup agent to enable application aware de-dup of data blocks on the one or more virtualized storage arrays in the storage area network, as described above.

According to yet another aspect of the present subject matter, a SAN includes a host device, and one or more virtualized storage arrays connected to the host device. Each of the host device and the one or more virtualized storage arrays includes an associated de-dup agent to enable application aware de-dup of data blocks on the one or more virtualized storage arrays in the storage area network, as described above.

According to a further another aspect of the present subject matter, a non-transitory computer-readable storage medium for application aware de-dup of data blocks on virtualized storage arrays in a SAN has instructions that, when executed by a computing device causes the computing device to perform the method as described above.

The methods, and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for application aware de-duplication (de-dup) of data blocks in a virtualized storage array is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
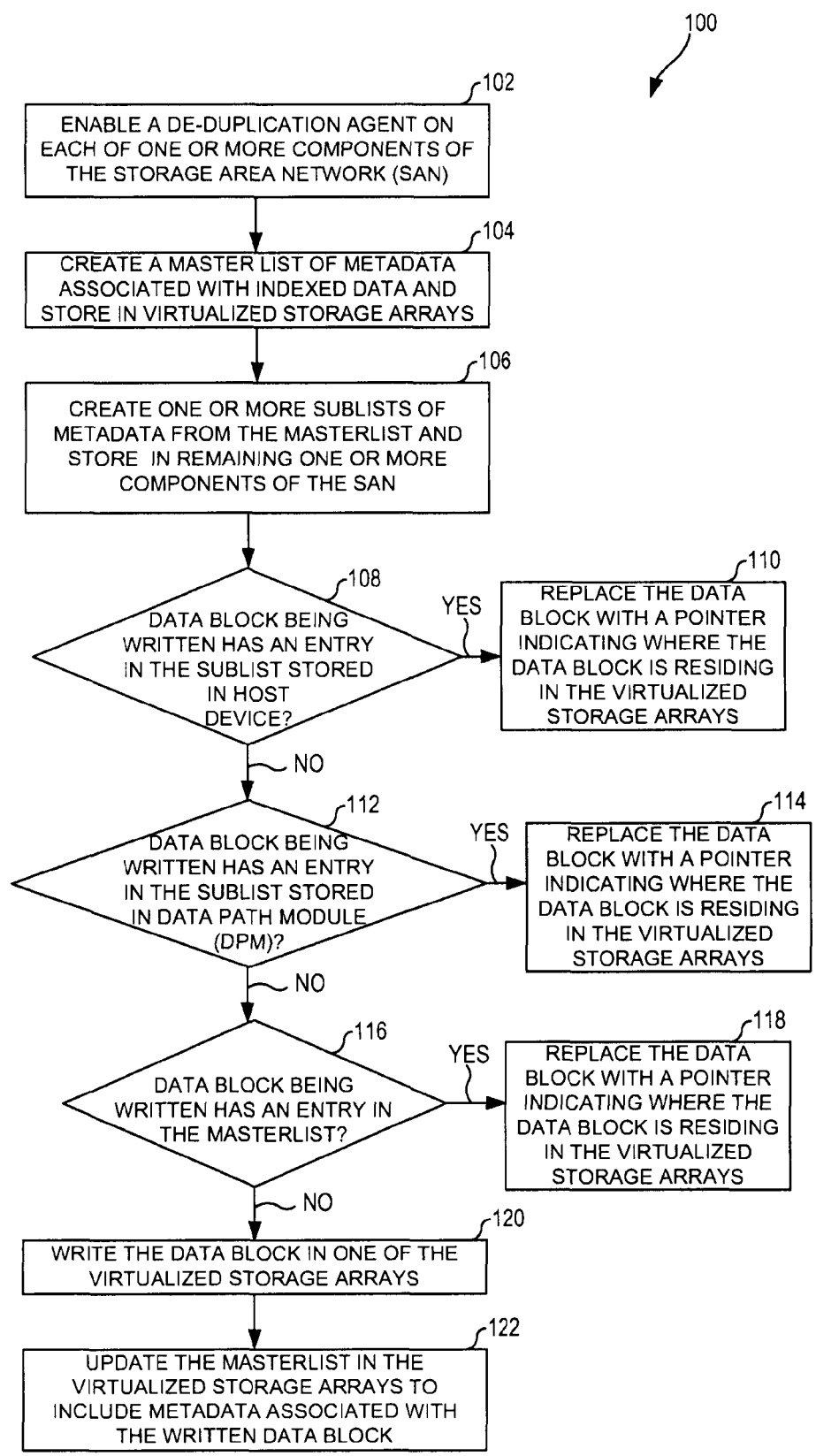
FIG. 1 illustrates a method for application aware de-duplication (de-dup) of data blocks on virtualized storage arrays in a storage area network (SAN), according to one embodiment.

FIG. 1 illustrates a method 100 for application aware de-dup of data blocks on virtualized storage arrays in a storage area network (SAN) (e.g., the SAN 214 of FIG. 2), according to one embodiment. At step 102, a de-dup agent is enabled on each of one or more components of the SAN. For example, the one or more components of the SAN include a host device (e.g., the host device 202 of FIG. 2), a data path module (DPM) (e.g., the DPM 216 of FIG. 2), and virtualized storage arrays (e.g., the virtualized storage arrays 222A-N of FIG. 2). The DPM is a software piece residing either on standardized hardware or running on a storage controller of the virtualized storage array.

At step 104, a master list of metadata associated with indexed data is created and stored in the virtualized storage arrays. For example, the master list of metadata is an ordered weightage list decided based on number of occurrences of data blocks in each of the virtualized storage arrays. At step 106, one or more sublists of metadata are created from the masterlist and are stored in remaining one or more components of the SAN. The creation of the masterlist and the sublists are explained in greater detail with respect to FIG. 2.

At step 108, it is determined whether a data block being written has an entry in the sublist stored in the host device upon receiving a write request from an application residing in the host device. If it is determined so, at step 110, the data block is replaced with a pointer indicating where the data block is residing in the virtualized storage arrays. If it is determined not, at step 112, it is determined whether the data block being written has an entry in the sublist stored in the DPM.

If it is determined that the data block being written has an entry in the sublist stored in the DPM, then at step 114, the data block is replaced with a pointer indicating where the data block is residing in the virtualized storage arrays. If it is determined that the data block being written has no entry in the sublist stored in the DPM, at step 116, it is determined whether the data block being written is in the masterlist stored in the virtualized storage arrays. If it is determined that the data block being written is in the masterlist stored in the virtualized storage arrays, then at step 118, the data block is replaced with a pointer indicating where the data block is residing in the virtualized storage arrays. If it is determined that the data block being written is not in the masterlist stored in the virtualized storage arrays, then at step 120, the data block is written in one of the virtualized storage arrays.

At step 122, the masterlist in the virtualized storage arrays is updated to include metadata associated with the written data block. Moreover, in one example embodiment, a non-transitory computer-readable storage medium for application aware de-dup of data blocks on virtualized storage arrays in the SAN, having instructions that, when executed by a computing device causes the computing device to perform the method as described above.

Figure 2:
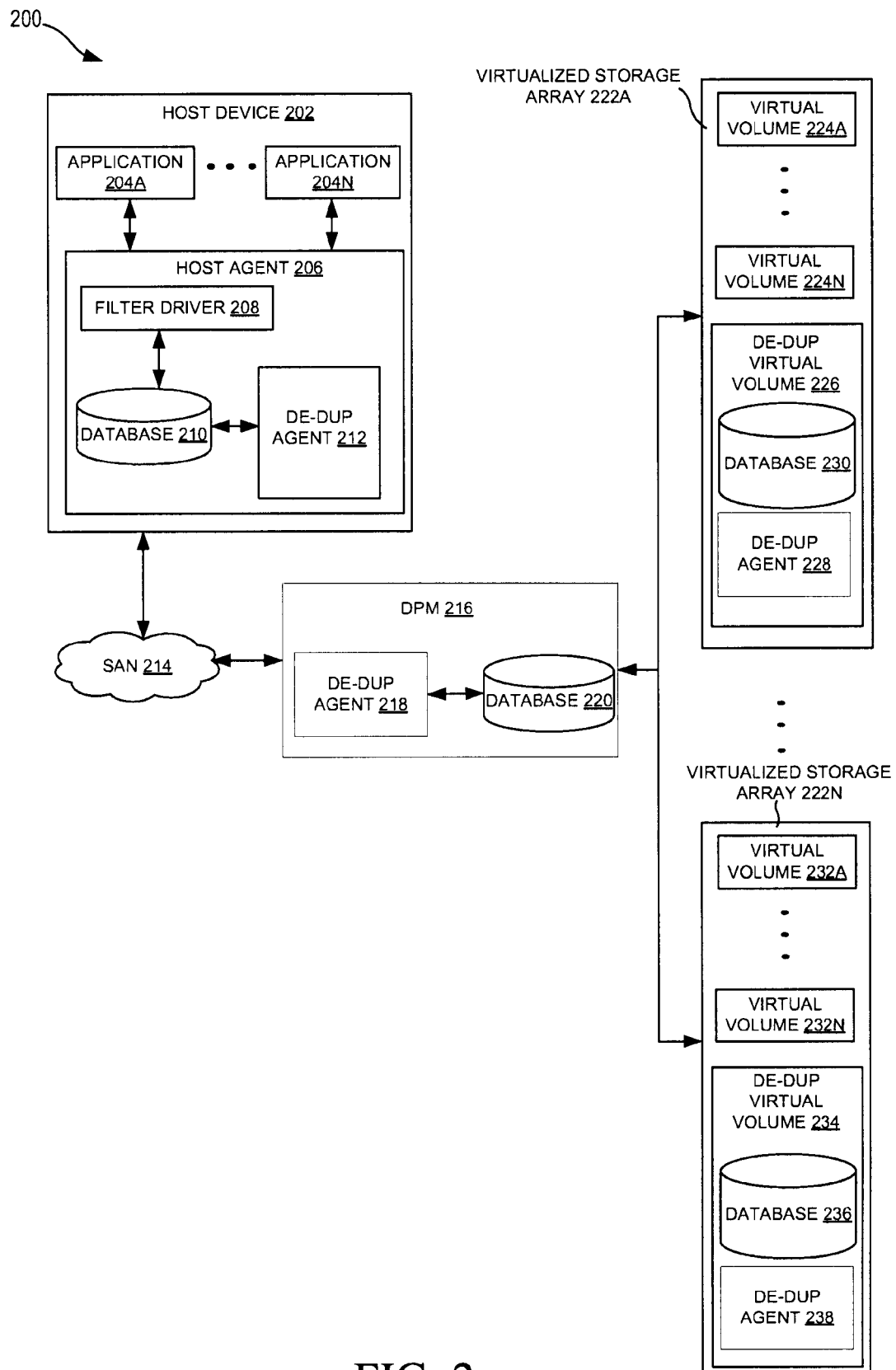
FIG. 2 illustrates a SAN environment employing the application aware de-dup of the data blocks on the virtualized storage arrays, according to one embodiment.

FIG. 2 illustrates a SAN environment 200 employing the application aware de-dup of data blocks on virtualized storage arrays 222A-N, according to one embodiment. As shown, FIG. 2 includes a host device 202 including applications 204A-N and a host agent 206. The host agent 206 includes a filter driver 208, a database 210, and a de-dup agent 212. The host device 202 is connected to the virtualized storage arrays 222A-N over a SAN 214. As shown, the virtualized storage arrays 222A-N are partitioned into thin provisioned virtual volumes 224A-N. Also, shown in FIG. 2 is a DPM 216 residing between the host device 202 and the virtualized storage arrays 222A-N. The DPM also includes a de-dup agent 218 and a database 220.

In one example, when a de-dup operation is initiated on a virtual volume 224A, a de-dup virtual volume 226 is created on the virtualized storage array 222A. The de-dup virtual volume 226 is a hidden volume and is not presented to the host device 202. Then, data blocks on the virtualized storage array 222A are read and a checksum per data block is created. The checksum is indexed to its location on the virtualized storage arrays 222A and is stored in a database 230 in the virtualized storage array 222A.

Figure 4:
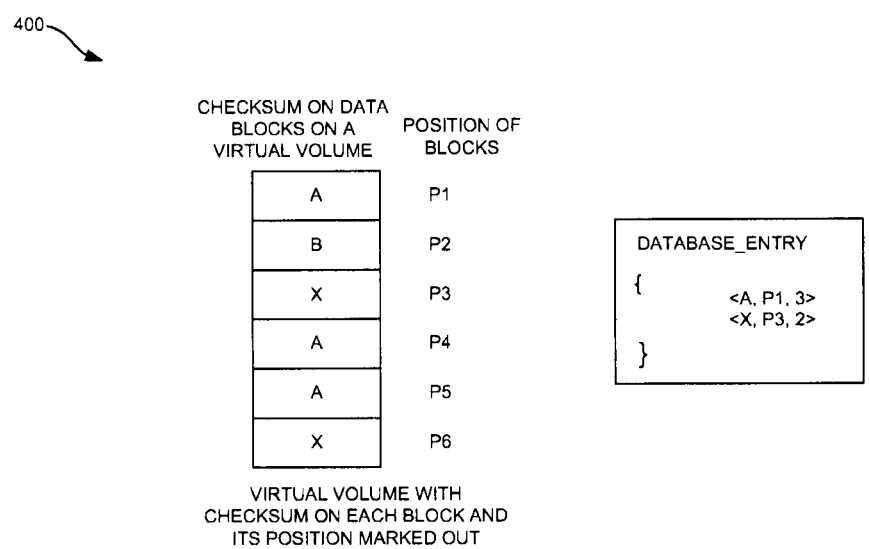
FIG. 4 illustrates a representation of a database for checksum computed across the data blocks on the virtualized storage arrays, according to one embodiment.

Further, number of times the checksum is found in the virtualized storage array 222A is stored in the database 230. Then, the database 230 is sorted to obtain a masterlist of metadata. For example, the master list of metadata includes an ordered weightage list whose order is decided based on number of occurrences of the data blocks in the virtualized storage array 222A. A representation of the database 230 for checksum computed across the data blocks on the virtualized storage array 222A is shown in FIG. 4.

According to an embodiment of the present subject matter, the masterlist of metadata in the database 230 is distributed across the SAN environment 200. For example, the host device 202 and the DPM 216 may request and obtain sublists from the masterlist of metadata. The sublist in the host device 202 reflects most duplicated data blocks and is stored in the database 210. The sublist in the DPM 216 may include more and different entries made available to the host device 202 and are stored in the database 220.

It can be seen that, only duplicate data blocks coming from the host device 202 after the masterlist and the sublists are formed in the respective databases are de-duped. This ensures that the masterlists and the sublists are formed offline and not by blocking input/output (I/O) from the host device 202. The filter driver 208 filters the data blocks coming from the host device 202 towards the virtualized storage arrays 222A-N. The method of application aware de-dup of the data blocks on virtualized storage arrays in the SAN is similar to the method described in FIG. 1.

Figure 3:
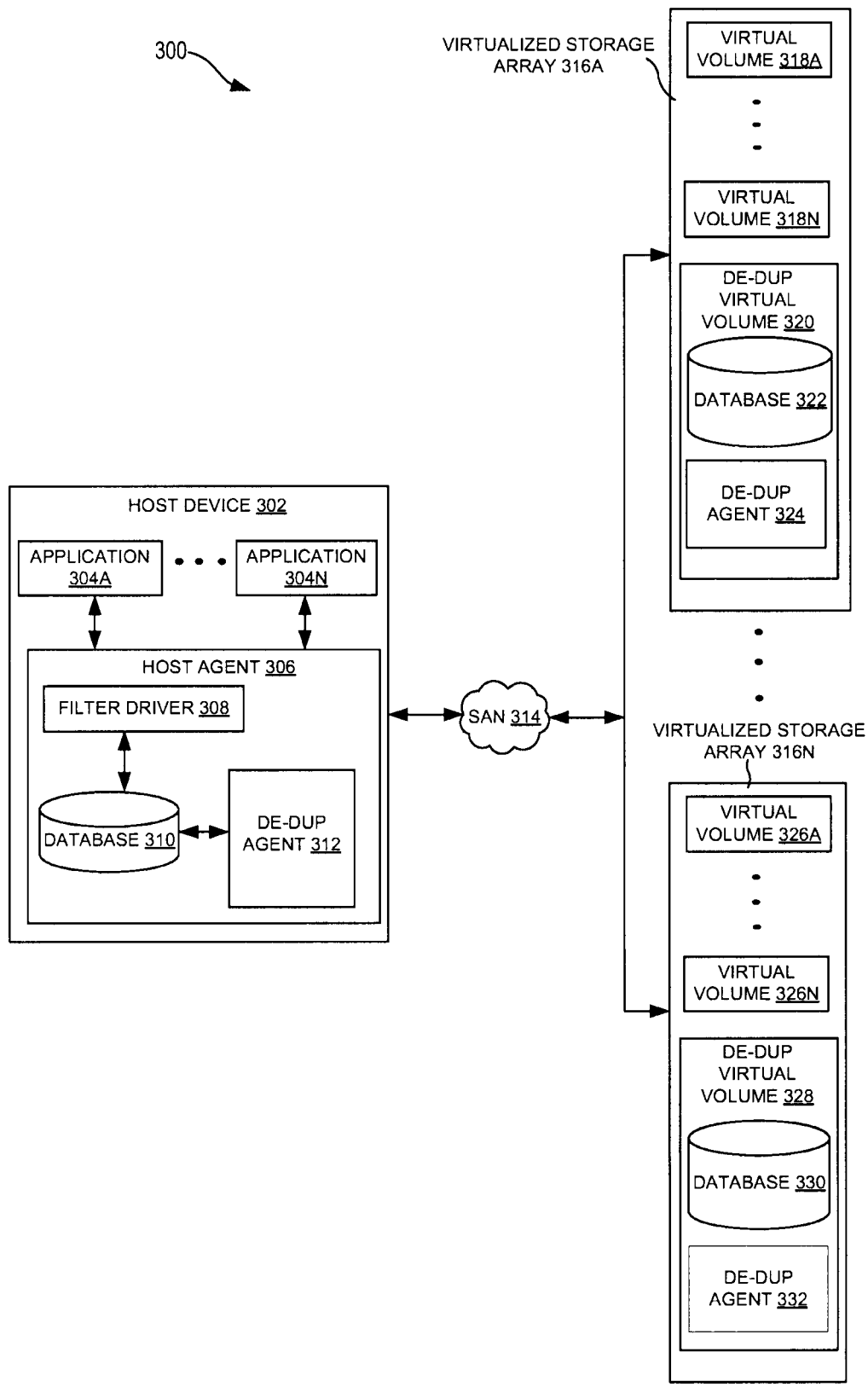
FIG. 3 illustrates yet another SAN environment employing the application aware de-dup of the data blocks on the virtualized storage arrays, according to one embodiment.

FIG. 3 illustrates yet another SAN environment 300 employing the application aware de-dup of data blocks on virtualized storage arrays 316A-N, according to one embodiment. The SAN environment 300 is similar to the SAN environment 200 except that the SAN environment 300 does not include a DPM.

FIG. 4 illustrates a representation 400 of the database 230 for checksum computed across the data blocks on the virtualized storage arrays 222A-N, according to one embodiment. As shown, as the virtual volumes 224A-N are parsed on a data block basis, every duplicate checksum identified is stored. The number of times the checksum is found is also stored. It can be seen that, smaller size of the data blocks, larger the size of database and vice versa. The checksum is indexed to original position on the virtualized storage arrays 222A-N. Then, the database 230 is sorted to obtain a ranked list (e.g., the masterlist) of most duplicate data blocks on the virtualized storage arrays 222A-N.

Figure 5:
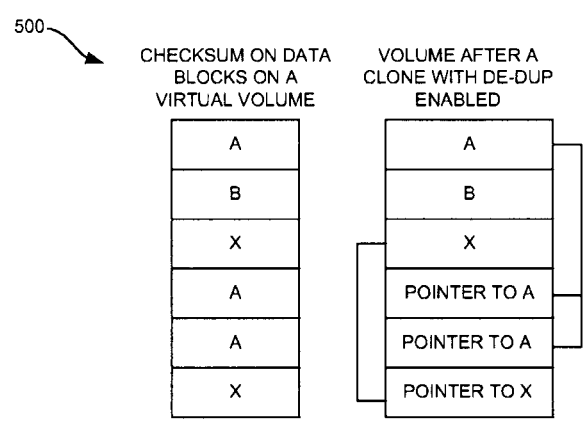
FIG. 5 illustrates a de-dup on an offline volume, according to one embodiment.

FIG. 5 illustrates a de-dup on an offline volume, according to one embodiment. Particularly, FIG. 5 depicts how a volume is re-sized after a clone or copy operation. According to one embodiment of the present subject matter, an offline de-dup capability may be incorporated in the SAN 214 depending on I/O performance. Here, the host agent 206 does not have any sublist from the masterlist and all I/Os are passed on directly to the DPM 216 which writes them to the appropriate volume on the virtualized storage arrays. At a pre-designated time or based on user action, the DPM 216 generates a checksum for each data block written new and compares that with the ones in the database 220 of the DPM 216. If any duplicate data blocks are found, the newly written copy is eliminated. The DPM 216 then inserts necessary metadata to ensure that a subsequent read operation can regenerate the de-duped data, as in the case of an online de-dup.

Such an offline approach may be integrated to a snapshot or a snapcopy or clone operation. When a snapshot is initiated, all further write operations on the point-in-time (PiT) can be checked for duplicates on the original volume (which is now a read-only volume), and duplicates, if any, eliminated. In such a way, the size of the entire PiT may be significantly reduced. Also, additionally, when a PiT is merged back to the original volume, the de-dup database can be now utilized to weed out all duplicates.

This also has special significance to a hierarchical storage management (HSM) system with the ability to eliminate duplicates while generating a copy or a clone. Thus, disk size needed for storing data in low cost/low I/O disk based solutions is greatly reduced. Once the copy is generated, the copied volume have internal references for all duplicate data blocks and may not have any references to the original volume from where the copy was initiated from. Any read operation also goes through the DPM 216. The DPM 216 looks in the database 220 to see if the data block being referenced has been de-duped and, if so, translates the read request to refer to an original copy on an appropriate virtual volume.

In various embodiments, the systems and methods described in FIGS. 1 through 5 reduces SAN traffic through an application aware and distributed de-dup on virtualized 13 storage arrays. Since, the above-mentioned systems and methods do not require any specialized hardware or software, total cost of ownership is reduced. The above-described methods and systems also work well when primary data needs to be backed up (e.g., a snapclone or a copy) to a secondary volume for backup or test.

Further, the above-described methods and systems fits well into a hierarchical storage management (HSM) policy that customers might have when they plan for data retention with lower cost media. The above-described methods and systems fit into both inline de-dup solution as well as offline de-dup solution. The above-described methods and systems also enable generating a PiT copy and merging back the PiT to an original volume. Further, the above-described methods and systems enable a user to specify exact virtual volume where the de-dup has to be enabled based on requirements.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for de-duplication of data, the method comprising:
    creating a master list of metadata for a plurality of data blocks, wherein the master list is ordered according to a number of occurrences of each respective data block of the plurality of data blocks within a storage array;
    creating a first sublist of metadata, from the master list of metadata, for a first subset of the plurality of data blocks based on the first subset being duplicated more than a second subset of the plurality of the data blocks;
    providing the first sublist of metadata to a first component of a networked storage system;
    determining whether a data block being written has a corresponding entry in the master list of metadata based on a determination that the data block being written does not have any corresponding entry in the first sublist of metadata; and
    performing an action selected from a group consisting of:
        replacing the data block being written with a pointer when it is determined that the data block being written has a corresponding entry in the master list of metadata; and
        writing the data block to the storage array when it is determined that the data block being written does not have any corresponding entry in the master list of metadata.

2. The method of claim 1 wherein the determination that the data block being written does not have any corresponding entry in the first sublist of metadata is performed by a de-duplication agent of the first component.

3. The method of claim 1 further comprising:
    creating a second sublist of metadata from the master list of metadata; and
    providing the second sublist of metadata to a second component of the networked storage system,
    wherein the determining of whether the data block being written has a corresponding entry in the master list of metadata is performed further based on a determination that the data block being written does not have any corresponding entry in the second sublist of metadata.

4. The method of claim 3,
    wherein the first component includes a host device and the providing of the first sublist of metadata includes providing the first sublist of metadata to the host device, and
    wherein the second component includes a data path module and the providing of the second sublist of metadata includes providing the second sublist of metadata to the data path module.

5. The method of claim 1 further comprising updating the master list of metadata based on the data block being written.

6. The method of claim 1, wherein the creating of the master list of metadata includes sorting a database of checksums representing the data blocks, the database stored on a virtual volume of the storage array.

7. The method of claim 1, wherein the determining of whether the data block being written has a corresponding entry in the master list of metadata is performed in part by a de-duplication agent of the storage array.

8. The method of claim 1, wherein the determining of whether the data block being written has a corresponding entry in the master list of metadata is performed further based on a request received from the first component.

9. The method of claim 1, wherein the first component includes one of: a host or a data path module coupling the host to the storage array.

10. A non-transitory machine readable medium having stored thereon instructions for performing a method comprising machine executable code which when executed by at least one machine, causes the machine to:
provide a first sublist of a master list of metadata to a first component of a networked storage system, wherein the first sublist corresponds to a first subset of a plurality of data blocks stored in a storage array, and wherein the first subset is selected based on being duplicated more than a second subset of the plurality of data blocks;
determine whether a data block being written has any corresponding entry within the master list of metadata based on a determination that the data block being written does not have any corresponding entry within the first sublist; and
perform an action selected from the group consisting of:
replacing the data block being written with a pointer to a corresponding block within the storage array when it is determined that the data block being written has a corresponding entry within the master list of metadata; and
writing the data block to the storage array when it is determined that the data block being written does not have any corresponding entry in the master list of metadata.

11. The non-transitory machine readable medium of claim 10 having further machine executable code that causes the machine to create the first sublist from the master list of metadata.

12. The non-transitory machine readable medium of claim 11 having further machine executable code that causes the machine to:
create a second sublist from the master list of metadata; and
provide the second sublist to a second component of the networked storage system.

13. The non-transitory machine readable medium of claim 10 having further machine executable code that causes the machine to update the master list of metadata based on the data block being written.

14. The non-transitory machine readable medium of claim 10, wherein the machine executable code that causes the machine to determine whether the data block being written has any corresponding entry in the master list of metadata includes further machine executable code that causes the machine to make the determination further based on a request received from the first component.

15. A computing device comprising:
a memory containing machine readable medium comprising machine executable code having stored thereon instructions for performing a method of data de-duplication;
a processor coupled to the memory, the processor configured to execute the machine executable code to cause the processor to:
create a master list of metadata for a plurality of data blocks stored within a storage array;
create a first sublist of metadata from the master list of metadata;
provide the first sublist of metadata to a first component for use by a de-duplication agent running thereupon;
create a second sublist of metadata from the master list of metadata that is different from the first sublist;
provide the second sublist of metadata to a second component for use by a de-duplication agent running thereupon;
determine whether a data block being written has a corresponding entry in the master list of metadata, wherein the determining is performed based on the de-duplication agent of the first component determining that the data block does not have a corresponding entry in the first sublist of metadata and based on the de-duplication agent of the second component determining that the data block does not have a corresponding entry in the second sublist of metadata; and
perform an action from the group consisting of:
replacing the data block being written with a pointer in response to determining that the data block being written has a corresponding entry in the master list of metadata; and
writing the data block to the storage array in response to determining that the data block being written does not have a corresponding entry in the master list of metadata.

16. The computing device of claim 15, wherein the processor is further configured to execute the machine executable code to create the first sublist of metadata from a first subset of the plurality of data blocks based on the first subset being duplicated more than a second subset of the plurality of data blocks.

17. The computing device of claim 15, wherein the second sublist of metadata contains more entries than the first sublist of metadata.

18. The computing device of claim 15, wherein the first component includes a host device; and
wherein the second component includes a data path module.

19. The computing device of claim 15, wherein the processor is further configured to execute the machine executable code to update the master list of metadata based on the data block being written.

20. The computing device of claim 15, wherein the storage array is thin provisioned.

* * * * *